United States Patent
George et al.

(10) Patent No.: US 10,960,572 B2
(45) Date of Patent: Mar. 30, 2021

(54) SYSTEMS FOR AND METHODS OF DRYING THE SKIN OF A CELLULAR CERAMIC WARE

(71) Applicant: Corning Incorporated, Corning, NY (US)

(72) Inventors: Jacob George, Horseheads, NY (US); Amit Halder, Painted Post, NY (US); Madison Minjoo Lee, Chicago, IL (US)

(73) Assignee: Corning Incorporated, Corning, NY (US)

( * ) Notice: Subject to any disclaimer, the term of this patent is extended or adjusted under 35 U.S.C. 154(b) by 300 days.

(21) Appl. No.: 15/560,378

(22) PCT Filed: Mar. 21, 2016

(86) PCT No.: PCT/US2016/023373
§ 371 (c)(1),
(2) Date: Sep. 21, 2017

(87) PCT Pub. No.: WO2016/154097
PCT Pub. Date: Sep. 29, 2016

(65) Prior Publication Data
US 2018/0065275 A1 Mar. 8, 2018

Related U.S. Application Data

(60) Provisional application No. 62/138,001, filed on Mar. 25, 2015.

(51) Int. Cl.
*B28B 11/24* (2006.01)
*C04B 35/14* (2006.01)
(Continued)

(52) U.S. Cl.
CPC ............ *B28B 11/243* (2013.01); *C04B 33/30* (2013.01); *C04B 35/14* (2013.01); *F26B 3/06* (2013.01);
(Continued)

(58) Field of Classification Search
CPC . B28B 11/243; C04B 2235/606; C04B 33/30; C04B 35/14; F26B 21/006; F26B 2210/02; F26B 3/06
See application file for complete search history.

(56) References Cited

U.S. PATENT DOCUMENTS

| 2,709,307 A | 5/1955 | Pass |
| 4,426,793 A | 1/1984 | Kuboyama |

(Continued)

FOREIGN PATENT DOCUMENTS

| DE | 623511 A1 | 12/1935 |
| JP | 02190307 A | 7/1990 |

(Continued)

OTHER PUBLICATIONS

International Search Report and Written Opinion of the International Searching Authority; PCT/US2016/023373; dated Oct. 18, 2016; 21 Pages; European Patent Office.

(Continued)

*Primary Examiner* — Edelmira Bosques
*Assistant Examiner* — Logan P Jones
(74) *Attorney, Agent, or Firm* — Kurt R Denniston (57) ABSTRACT

Systems for and methods of drying a wet skin of a wet skinned ceramic ware are disclosed. The wet skinned ceramic ware includes a dry interior web with an outer surface. The wet skin is disposed on the outer surface of the dry interior web. The method includes generating an airstream and then directing the airstream through a first end of the wet-skinned ceramic ware only through an annular (Continued)

portion of the interior web that is adjacent the outer surface of the interior web. The flow of the airstream through the annular portion of the interior web causes moisture in the wet skin to migrate inwardly toward the interior web. The moisture is removed from the annular portion of the interior web when the airstream exits a second end of the ceramic ware, thereby drying the skin from the inside out of the wet-skinned ceramic ware.

19 Claims, 10 Drawing Sheets

(51) Int. Cl.
*C04B 33/30* (2006.01)
*F26B 3/06* (2006.01)
*F26B 21/00* (2006.01)

(52) U.S. Cl.
CPC ...... *F26B 21/006* (2013.01); *C04B 2235/606* (2013.01); *F26B 2210/02* (2013.01)

(56) References Cited

U.S. PATENT DOCUMENTS

| | | | |
|---|---|---|---|
| 4,597,193 A | 7/1986 | Kallfass | |
| 4,840,827 A * | 6/1989 | Mizutani | B01D 53/86 156/89.22 |
| 5,629,067 A * | 5/1997 | Kotani | C04B 41/009 422/177 |
| 5,919,014 A | 7/1999 | Weck et al. | |
| 7,591,918 B2 * | 9/2009 | Suwabe | B01D 46/0001 156/89.22 |
| 7,695,796 B2 * | 4/2010 | Ichikawa | B01D 39/12 428/116 |
| 7,842,227 B2 | 11/2010 | Kasai et al. | |
| 8,075,829 B2 | 12/2011 | Takagi et al. | |
| 8,277,895 B2 * | 10/2012 | Kono | B01J 35/04 427/372.2 |
| 8,481,900 B2 | 7/2013 | Pitsakis | |
| 8,673,207 B1 | 3/2014 | Boger et al. | |
| 9,139,479 B2 | 9/2015 | Chapman et al. | |
| 2004/0079469 A1 * | 4/2004 | Chan | C04B 35/195 156/89.11 |
| 2009/0200712 A1 * | 8/2009 | Hayashi | B28B 11/241 264/630 |
| 2009/0235552 A1 | 9/2009 | Takagi et al. | |
| 2009/0320315 A1 | 12/2009 | Horiba et al. | |
| 2010/0304041 A1 | 12/2010 | Fletcher et al. | |
| 2011/0227256 A1 | 9/2011 | Okumura et al. | |
| 2014/0007452 A1 * | 1/2014 | Saito | B28B 11/243 34/265 |
| 2014/0147621 A1 | 5/2014 | Chapman et al. | |
| 2014/0327186 A1 | 11/2014 | Cutler et al. | |

FOREIGN PATENT DOCUMENTS

| | | |
|---|---|---|
| JP | 2007190712 A | 8/2007 |
| JP | 2008229872 A | 10/2008 |
| WO | 2013125525 A1 | 8/2013 |

OTHER PUBLICATIONS

Invitation to Pay Additional Fees From the International Searching Authority; PCT/US2016/023373; dated Jul. 1, 2016; 7 Pages; European Patent Office.
Machine Translation of JP2017549733 Office Action dated Apr. 17, 2019; 4 Pages; Japanese Patent Office.
English Translation of CN201680030024.9 First Office Action dated Jun. 3, 2019, China Patent Office, 11 Pgs.

* cited by examiner

SYSTEMS FOR AND METHODS OF DRYING THE SKIN OF A CELLULAR CERAMIC WARE

This application is a national stage application under 35 U.S.C. § 371 of International Patent Application Serial No. PCT/US2016/023373 filed on Mar. 21, 2016, which claims the benefit of U.S. Provisional Patent Application No. 62/138,001, filed on Mar. 25, 2015, the contents of both are relied upon and incorporated herein by reference in their entireties.

FIELD

The present disclosure relates to cellular ceramic wares, and in particular relates to systems for and methods of drying the skin of a cellular ceramic ware.

BACKGROUND

Ceramic greenwares having an array of channels are formed, for example, by extrusion or casting and then processed (i.e., dried and fired) to form ceramic articles or "ceramic wares." These ceramic wares can be further processed to form filters and catalytic converters having a honeycomb porous structure for use in exhaust-producing engines and related applications. Ceramic greenwares can be formed by extruding a plasticized batch comprising ceramic-forming components, or ceramic precursors, through a die, such as a die that produces a honeycomb structure, to form an extrudate of the ceramic-forming material. The extrudate that exits the extruder is cut transversely to the direction of extrusion to form a greenware piece. The piece may itself be transversely cut into shorter pieces after drying.

The ceramic ware dimensions can vary due to drying and firing shrinkage during manufacturing. Ceramic wares can also be difficult to manufacture to the stringent external dimensional requirements set by original equipment manufacturers (OEMs) and the supply chain. To help ensure compliance with dimensional requirements, ceramic wares can be machined or "contoured" to a desired dimension. A thin layer of ceramic cement is then used to form an exterior skin that provides a smooth protective outer surface for the ceramic ware.

SUMMARY

An aspect of the disclosure is a method of drying an outer peripheral portion of a cellular ceramic ware, the ware comprising an interior web having walls that define a plurality of channels extending between first and second ends of the ware. The method includes: preferentially directing a stream of gas into the interior web adjacent to the outer peripheral portion, to preferentially dry an inner surface of the outer peripheral portion.

Another aspect of the disclosure is the method described above, wherein no gas is directed to the outer surface of the outer peripheral portion.

Another aspect of the disclosure is the method described above, wherein no gas is directed into at least one of the innermost channels of the interior web.

Another aspect of the disclosure is the method described above, wherein the gas is directed annularly into the interior web.

Another aspect of the disclosure is the method described above, wherein the preferential drying causes a liquid in the outer peripheral portion to migrate in to one or more channels of the interior web.

Another aspect of the disclosure is the method described above, wherein the liquid includes at least one of: water, alcohol, glycerol, and glycerin.

Another aspect of the disclosure is the method described above, wherein the outer peripheral portion comprises a ceramic or a glass.

Another aspect of the disclosure is the method described above, wherein the gas comprises at least one of: air, nitrogen, oxygen, helium and argon.

Another aspect of the disclosure is a method of drying a wet skin disposed on an outer surface of a dry unskinned cellular ceramic ware having first and second ends, a radius and a dry interior web that defines an array of cells. The method includes: generating an airstream; and directing the airstream through the first end of the ceramic ware only through an annular portion of the interior web that is adjacent the outer surface to cause moisture in the wet skin to migrate inwardly toward the interior web and to be removed from the annular portion of the interior web when the airstream exits the second end.

Another aspect of the disclosure is a method of drying a wet skin applied to an outer surface of a dried unskinned cellular ceramic ware having first and second ends, a radius and a dry interior web made up of central and outer longitudinal cells. The method includes: generating a substantially annular airstream; directing the substantially annular airstream into the first end of the ceramic ware only through the outer longitudinal cells that constitute an annular portion of the interior web adjacent the outer surface while not flowing a gas over an outer surface of the wet skin; and wherein the wet skin contains moisture, and wherein the moisture migrates inwardly toward the interior web due to the flow of the substantially annular airstream through the outer cells, and wherein the moisture is removed from the interior web by the flow of the substantially annular airstream through the outer cells and out of the second end.

Another aspect of the disclosure is a method of drying a wet-skinned ware defined by a dry unskinned cellular ceramic ware having a dry interior web with an outer surface on which is disposed a wet skin having an outer surface. The method includes: generating a substantially annular airstream; and directing the substantially annular airstream through a first end of the ceramic ware adjacent the outer surface of the dry interior web to cause moisture in the wet skin to migrate inwardly toward the dry interior web and to be removed from the annular portion of the dry interior web when the substantially annular airstream exits the second end; and avoiding a substantial flow of air or other gas over the outer surface of the wet skin.

Another aspect of the disclosure is a drying system for drying a wet-skinned ware defined by a wet skin disposed on an outer surface of a dry unskinned cellular ceramic ware having first and second ends, a radius and a dry interior web that defines an array of cells. The system includes: a blower that provides an initial flow of air; a flow-shaping device pneumatically connected to the blower, the flow-shaping device configured to form from the initial flow of air a substantially annular air stream; and a support member configured to operably support the wet-skinned ware relative to the flow-shaping device such that the substantially annular air stream is directed through the first end of the ceramic ware only through an annular portion of the interior web that is adjacent the outer surface.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiments and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are shown in some of the Figures for the sake of reference and are not intended to be limiting as to direction or orientation.

In the discussion below, reference to a "dry" unskinned ceramic ware or a "dry" interior web means that the unskinned ceramic ware or the interior web does not require further processing to remove moisture. A dry unskinned ceramic ware or a dry interior web can be formed for example by a first drying process or a first drying process followed by a second drying processor. For example, the first drying process may be conventional applicator-based drying and the second drying process may be a high-temperature thermal process such as firing (also called "sintering").

The ceramic skin (also called "skin cement" or just "skin") is applied wet, containing for example 10%-35% by weight of liquid. The skin needs to be dried to form the final ware or article. In some cases, the skin needs to be dried to greater than 98% dry (i.e., to having less than 2% of the original moisture content). The act or process of applying ceramic cement to the exterior of the ceramic ware is referred to as "skinning." A ceramic ware having skin disposed thereon is referred to as a "skinned" ceramic ware. A ceramic ware having wet skin disposed thereon is referred to as either a "wet-skinned ceramic ware" or a "wet-skinned ware" for short. In an example, the liquid in the skin can include one or more of water, alcohol, glycerol and glycerin.

The term "gas" as used herein can include one or more gas constituents. For example, air as a "gas" includes oxygen and nitrogen as two of its main constituents. While gas in the form of air is discussed below by way of example, another type of gas can also be used, including a gas that has either a single constituent (e.g., nitrogen) or multiple constituents (e.g., nitrogen, argon, helium, etc.). In an example, the gas includes or consists of one or more inert gases.

Ceramic wares are currently skinned after firing, and the skin is then dried in a hot air drier where the skin is directly exposed to hot air. This drying process can lead to the formation of cracks in the skin, which need to be repaired manually. The added labor and time for inspecting skinned honeycomb bodies and fixing skin-drying cracks leads to inefficiencies in product manufacturing. To avoid skin-drying cracks, a slow drying process can be employed, but this results in additional product manufacturing inefficiencies. Faster skin-drying methods that avoid cracking are desirable but to date have been difficult to achieve.

Figure 1:
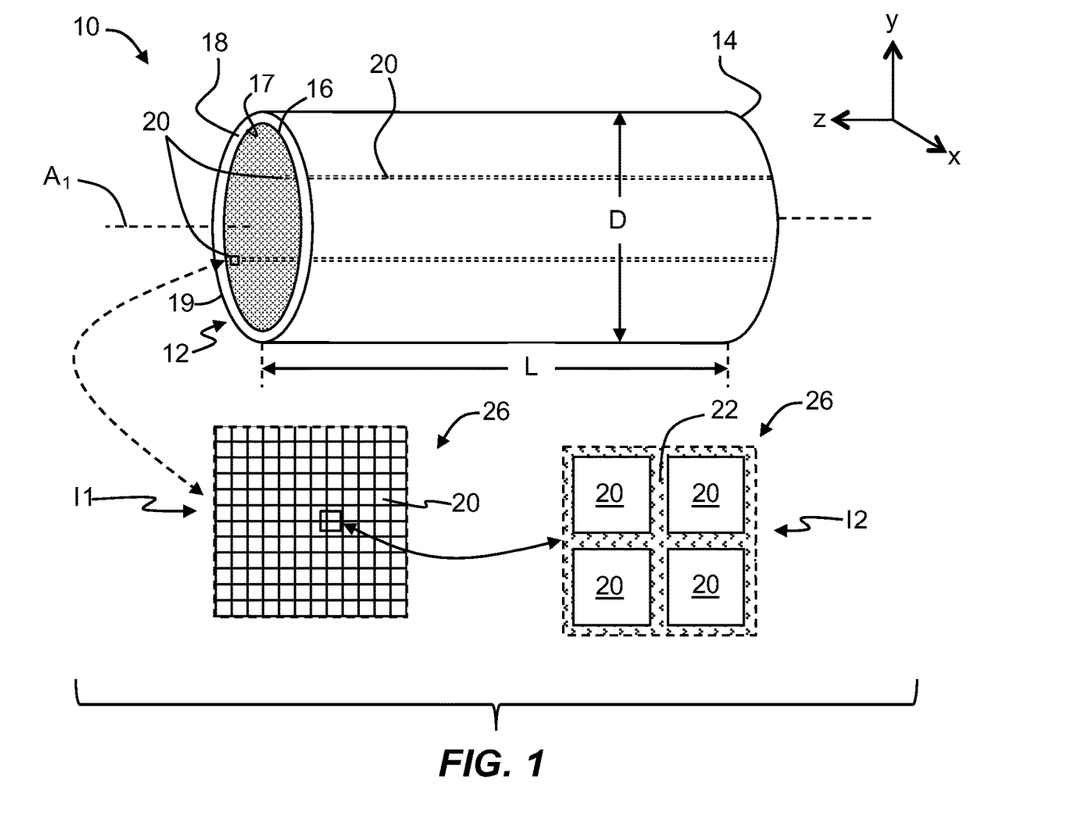
FIG. 1 is an isometric side view of an example skinned ceramic ware.
Figure 2A:
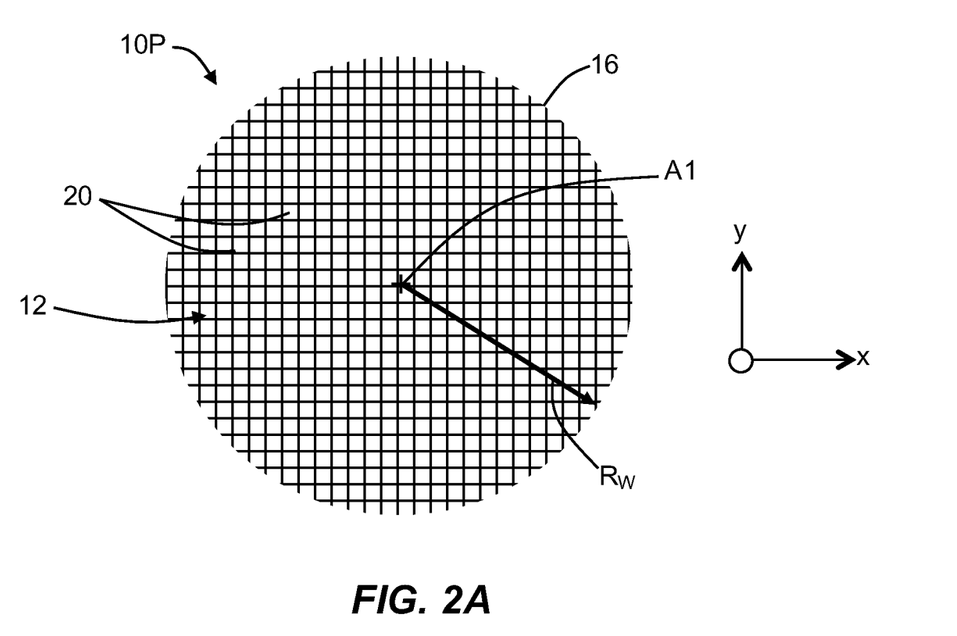
FIG. 2A is a front-on, close-up view of a preskinned (i.e., unskinned) ceramic ware.
Figure 2B:
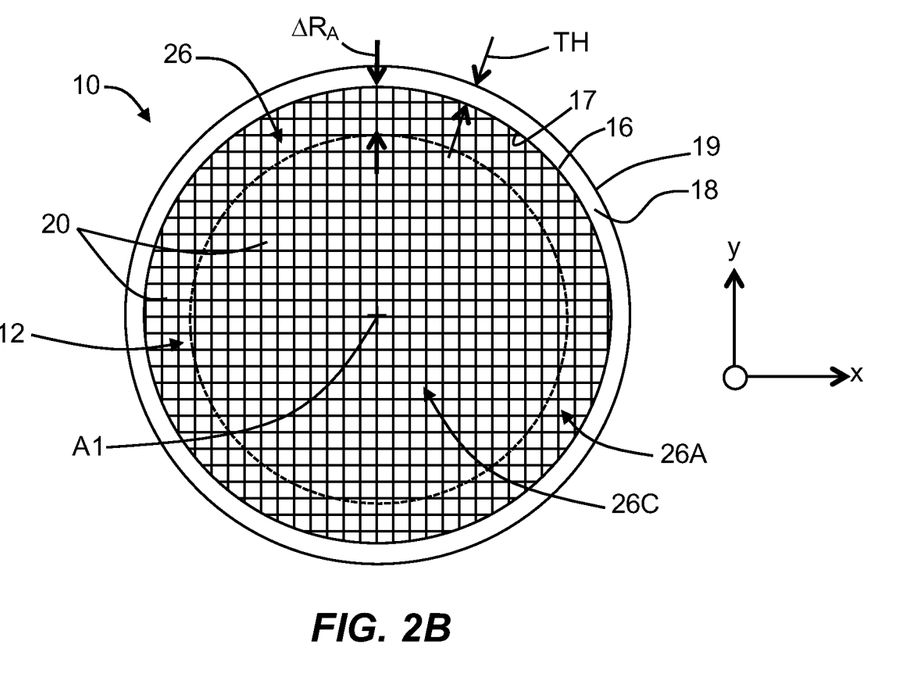
FIG. 2B is similar to FIG. 2A, but for the skinned ceramic ware of FIG. 1.

FIG. 1 is an isometric side view of an example skinned ceramic ware 10. FIG. 2A is a front-on, close-up view of a preskinned (i.e., unskinned) ceramic ware 10P that includes an outer surface 16, while FIG. 2B is similar to FIG. 2A but includes a layer of skin ("skin") 18 to define the skinned ceramic ware 10 of FIG. 1. The skin 18 is applied to outer surface 16 of unskinned ceramic ware 10P and has an inner surface 17 and an outer surface 19.

The skinned ceramic ware 10 has a central axis $A_1$, a front end 12 and a back end 14. The skinned ceramic ware 10 can have any reasonable cross-sectional shape, such as circular, elliptical, asymmetrical, polygonal, etc. The cross-sectional shape can be formed by extrusion or contoured after forming and drying or after forming, drying, and firing.

In an example, skinned ceramic ware 10 has an array of longitudinally (z-axis) running cells 20 that are open at front and back ends 12 and 14 of the skinned ceramic ware (see first close-up inset 11 of FIG. 1). In the discussion below, front end 12 is used as an input end and back end 14 is used as an output end in the skin-drying process, as explained in greater detail below. The cells 20 are defined by cell walls 22 (see second close-up inset 12). In an example, cells 20 and walls 22 define a porous interior honeycomb structure or interior web ("web") 26 that has a web radius $R_W$ measured from central axis $A_1$ out to inner surface 17 of skin 18. The walls 22 can also be referred to as "web walls" and web 26 can also be referred to as a "web array." The cells 20 can be divided up into outer cells 20A that reside in an annular portion 26A of web 26 adjacent the cylindrical outer surface 16 of unskinned ware 1op (i.e., adjacent inner surface 17 of skin 18) and inner or "central" cells 20C that reside in a central portion 26C of the web that is interior to the annular portion (see FIG. 2B and FIG. 6).

As noted above, in an example skin 18 can be applied to cylindrical outer surface 16 of unskinned ceramic ware 10P after the unskinned ceramic ware has been dried and fired (or sintered), and after the fired and unskinned ceramic ware has been processed to have desired dimensions. This processing includes shaping or contouring and can also include grinding of the front and/or back ends 12 and 14. Typically, skin 18 does not cover front and back ends 12 and 14 of skinned ceramic ware 10.

The material making up skin 18 can be applied to cylindrical outer surface 16 of preskinned ceramic ware 10P using any of the known methods, e.g., by a doctor blade operation, by an axial skinning operation, by a spray casting operation, by a tape casting operation, or the like. The material of skin 18 that contacts the underlying cylindrical outer surface 16 defined by outermost cell walls 22 bonds thereto when the skin is cured.

In exemplary embodiments, skin 18 has a thickness TH on the order of millimeters, e.g., 0.5 mm to 4 mm. In one example, the skin thickness TH can be from about 0.5 mm to about 2.1 mm. For example, the skin thickness TH can be from about 0.5 mm to about 1.1 mm, or about 1.0 mm to about 1.5 mm, or even from about 1.4 mm to about 2.1 mm. When skin 18 is applied over an existing skin or the skin is a multilayer skin, the total skin thickness TH can be about twice that of a single-layer skin.

The composition of skin 18 can be any one of the compositions used in the art of ceramic ware formation. Example compositions for skin 18 are described in U.S. patent application Ser. No. 13/770,104, filed on Feb. 19, 2013. According to exemplary embodiments, the skin composition may comprise an inorganic filler material and a crystalline inorganic fibrous material. In exemplary embodiments, the inorganic filler material comprises at least 10% of the total weight of the inorganic solid components of the cement mixture, and the crystalline inorganic fibrous material comprises less than 25% of the total weight of the inorganic solid components of the cement mixture. In an example, skin 18 is made of substantially the same material that constitutes preskinned ceramic ware 10P.

Figure 3:
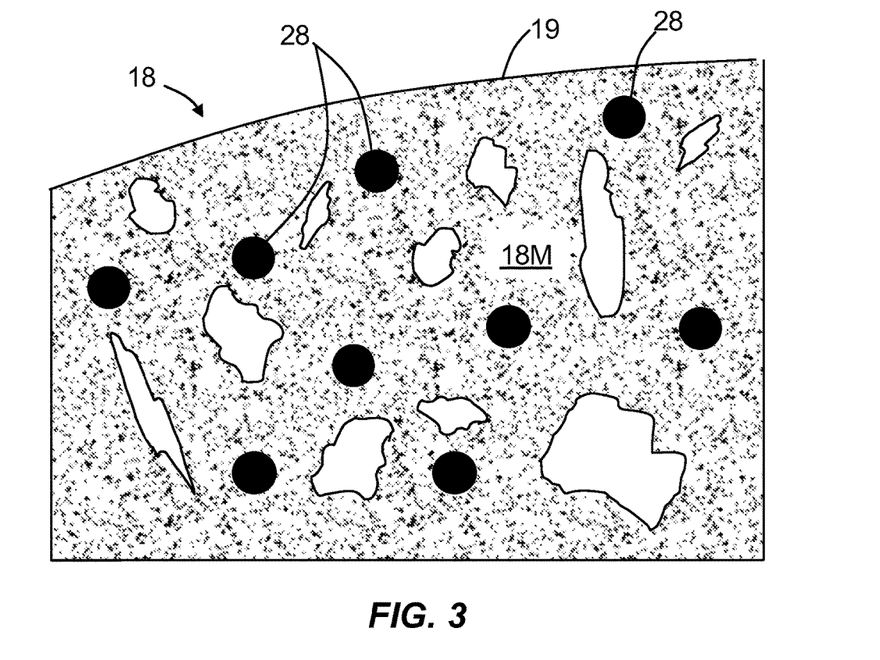
FIG. 3 is a close-up cross-sectional view of an example skin showing colloidal silica particles embedded in the skin matrix.

FIG. 3 is a close-up cross-sectional view of an example skin 18 that includes a skin matrix 18M with colloidal silica particles 28 (e.g., LUDOX® colloidal silica particles) embedded therein. An aspect of the method includes drying skin 18 from the inside of ceramic ware 10 such that colloidal silica particles 28 do not migrate outwardly toward outer surface 19 of skin 18. Such migration, which is observed in conventional hot-air drying, causes an increase in the concentration of colloidal silica particles 28 near outer surface 19, which lowers the overall skin strength.

As discussed above, the process of forming skinned ceramic ware 10 includes drying the wet skin 18 after it is applied to cylindrical outer surface 16 of unskinned ceramic ware 10P to form skinned ceramic ware 10. In an example, skin 18 of a dried skinned ceramic ware 10 has a moisture content of 10% or less of the original moisture content of a wet skinned ceramic ware. A ceramic ware 10 having a wet skin is referred to below as a "wet skinned ceramic ware" 10, or just a "wet-skinned ware" 10 for short.

Figure 4:
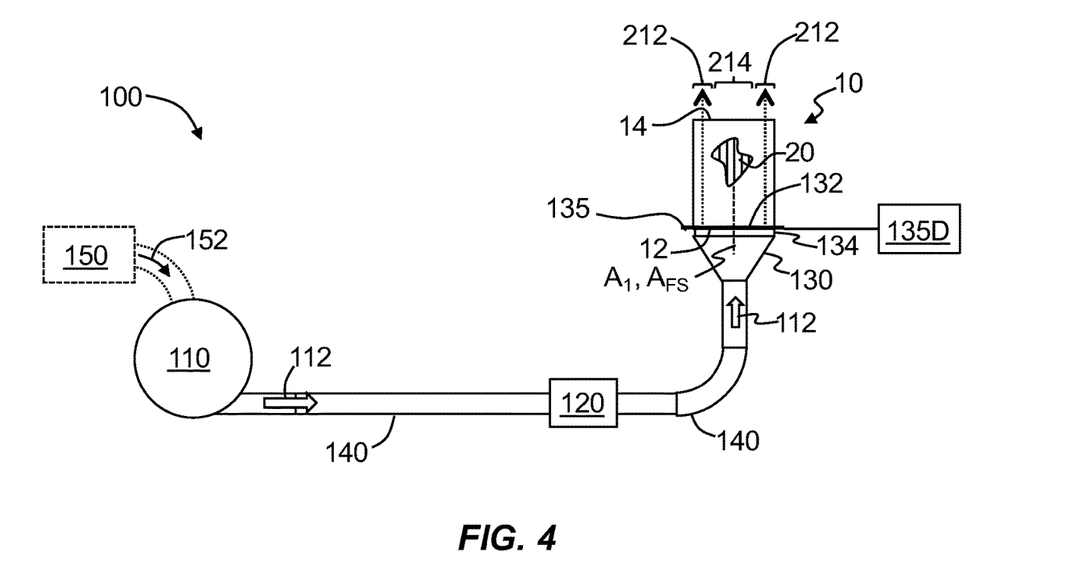
FIG. 4 is a schematic diagram of an example air-drying system used to carry out the methods as disclosed herein for drying the wet skin of skinned ceramic wares.

FIG. 4 is a schematic diagram of an example drying system ("system") 100 for drying wet-skinned wares 10 according to the methods disclosed herein. The system 100 includes a blower 110, an optional heater 120 and a flow-shaping device 130 all pneumatically connected by conduit (duct) sections 140. The flow-shaping device 130 includes an output end 132 that includes a perimeter 134 and a central axis $A_{FS}$.

Figure 5A:
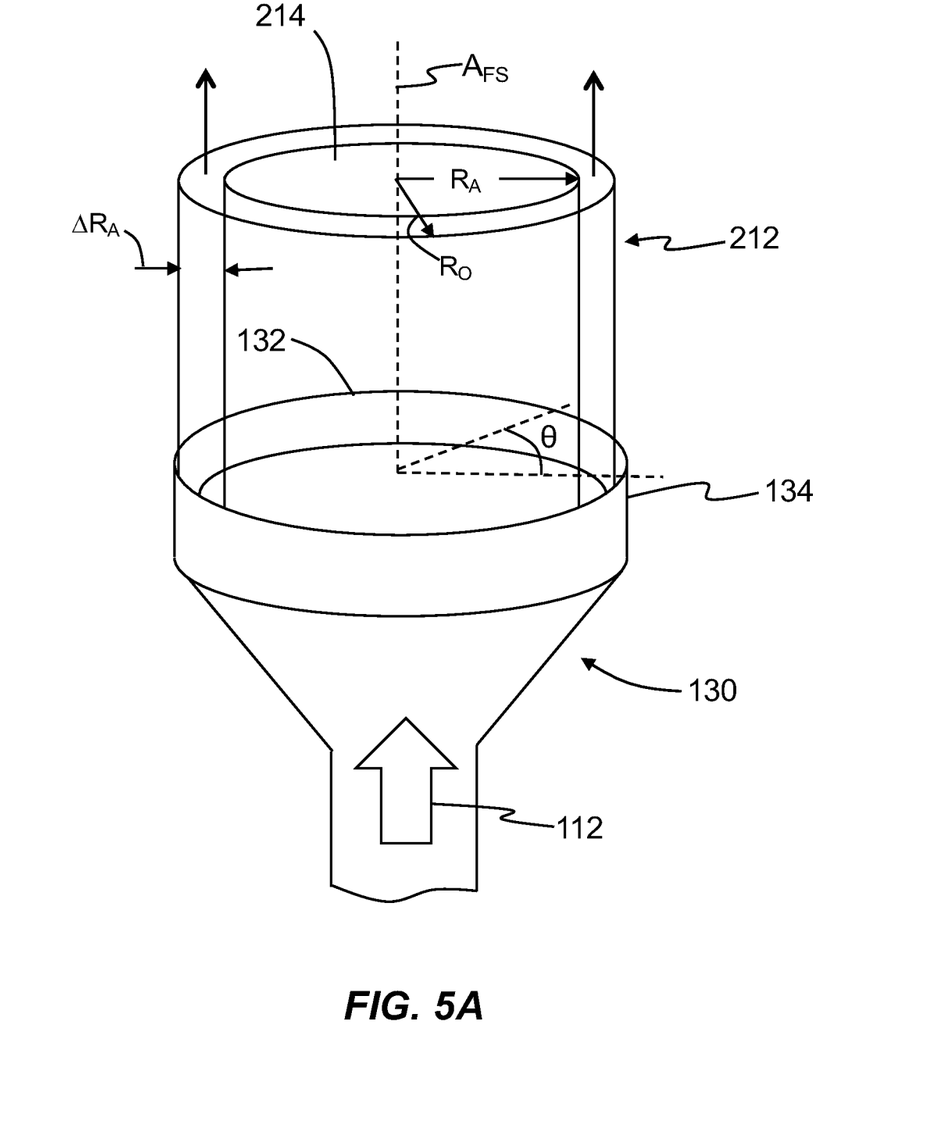
FIG. 5A is an elevated view of an example flow-shaping device showing an example of a cylindrical annular airstream emitted from the output end of a flow-shaping device.
Figure 5B:
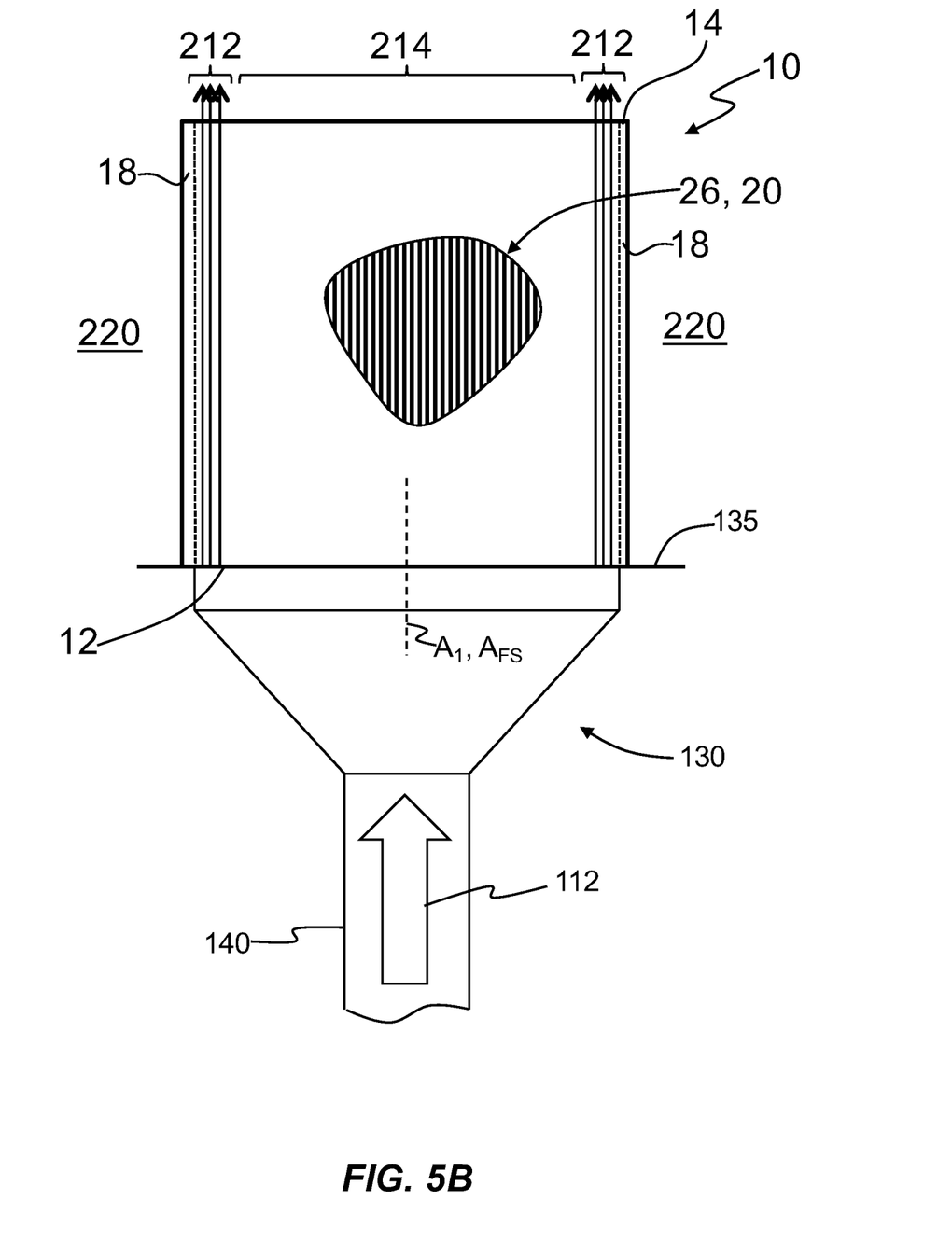
FIG. 5B is a side view of the flow-shaping device of FIG. 5A, also showing an example ceramic ware with a wet skin "wet-skinned ceramic ware") operably supported at the output end of the flow-shaping device by a support member so that the cylindrical annular airstream passes through outer cells in a corresponding annular portion of the web of the ceramic ware.

FIG. 5A is a close-up elevated view of an example flow-shaping device 130. FIG. 5B is a side view of flow-shaping device 130 of FIG. 5A and an example wet-skinned ware 10 operably arranged at output end 132 of the flow-shaping device such that central axis $A_1$ of the ceramic ware is substantially co-axial with central axis $A_{FS}$ of the flow-shaping device. The flow-shaping device 130 is configured to receive air 112 from blower 110 and output a desired airstream 212 from output end 132. The airstream 212 can then be preferentially directed into select outer cells 20A of wet-skinned ware 10.

In one example, airstream 212 is formed so that it simultaneously directs air through an annular section of outer cells 20A at once. In another example, airstream 212 is formed so that the air flows sequentially through select outer cells 20A. The sequential airflow method can be carried out in one example by rotating the wet-skinned ware relative to airstream 212, as described below.

In an example, airstream 212 has a substantially annular cylindrical shape (hereinafter "annular airstream"). In one example, annular airstream 212 has a substantially spatially uniform flow, while in other examples the airflow can vary as a function of position (e.g., as a function of angle θ or both the angle and radial distance from central axis $A_{FS}$). The annular airstream 212 defines a central region 214 where there is substantially no airflow. This central region 214 is referred to hereinafter as the "no-flow" region.

With reference to FIG. 4 and FIG. 5A, in an example, system 100 includes a support member 135 arranged adjacent output end 132 of flow-shaping device 130 to support wet-skinned ware 10 while allowing for airstream 212 to pass substantially uninterrupted to the ceramic ware, as described in greater detail below. In an example, support member 135 is rotatable (e.g., via the operation of a support member driver 135D) so that ceramic ware 10 rotates about its central axis $A_1$ and relative to airstream 212. Such rotation can serve to average out spatial variations in the airflow of airstream 212 and thus increase the uniformity of the drying process.

With continuing reference to FIG. 5A, in an example, annular airstream 212 has an inside radius $R_A$, an outside radius $R_O$, and radial thickness $\Delta R_A = R_O - R_A$. The annular airstream 212 can have a relatively narrow annular thickness $\Delta R_A$ so that the annular airstream has the geometry of an annular air blade or an annular air knife. In an example, the radial thickness $\Delta R_A$ can be measured using the number of cells 20 in ceramic ware 10, and in an example can be in the range from 1 cell to 200 cells, or in another example from 1 to 100 cells, or in another example from 10 cells to 50 cells. In an example, annular airstream 212 can have an aspect ratio $\rho = \Delta R_A / R_O$ in the range from 1% to 50% with the outside radius $R_O$ of the annular airstream being substantially the same as web radius $R_W$. For example, a 200/8 substrate/filter can correspond to approximately 1.7-mm-wide channels, a web thickness of 0.2 mm, and a web radius $R_W$ of 343 mm. In an example, the radial thickness $\Delta R_A$ is in the range from 0.2 mm to 500 mm, or in the range from 0.5 mm to 100 mm.

The system 100 is easiest to operate using air 112, but more generally the system can optionally employ a gas 152, such an inert gas, or a mixture of inert gasses, from a gas source 150. In the discussion below, system 100 is assumed to use air 112, which can be obtained from the ambient environment or from gas source 150. In an example, air 112 is processed (e.g., filtered, dehumidified, heated, etc.) prior to being delivered to wet-skinned ware 10. In an example, air 112 has a temperature in the range from 15° C. to 100° C. or in another example in the range from 20'C to 40° C.

With reference to FIGS. 4, 5A and 5B, in the operation of system 100, blower 110 blows air 112 through conduit sections 140 and through optional heater 120 and then to flow-shaping device 130. The flow-shaping device 130 receives air 112 and outputs the aforementioned annular airstream 212 at output end 132. The annular airstream 212 flows through outer cells 20A in annular portion 26A of web 26. The size of annular portion 26A of web 26 through which airstream 212 travels is defined by the radial thickness $\Delta R_A$ of the annular airstream.

In an example, wet-skinned ware 10 resides in an ambient atmosphere 220, which in an example has a relative humidity in the range from 20% to 80% or in other example in the range from 30% to 40%. Having such a humidity in ambient atmosphere 220 helps ensure that the skin drying process occurs substantially entirely from the inside of ceramic ware 10 rather than from the outside. In an example, skin 18 is dried in a time ("drying time") between 10 and 20 minutes with substantially no skin cracking (i.e., the skin is substantially free of cracks), as compared to 12 hours for ambient-air drying or about 1 hour for conventional hot-air drying. In an example, whether skin 18 has "substantially no skin cracking" is measured by whether the dried ceramic ware 10 has sufficiently few cracks to pass inspection and can be further processed to form a product, i.e., to not be rejected due to the presence of cracks.

Figure 6:
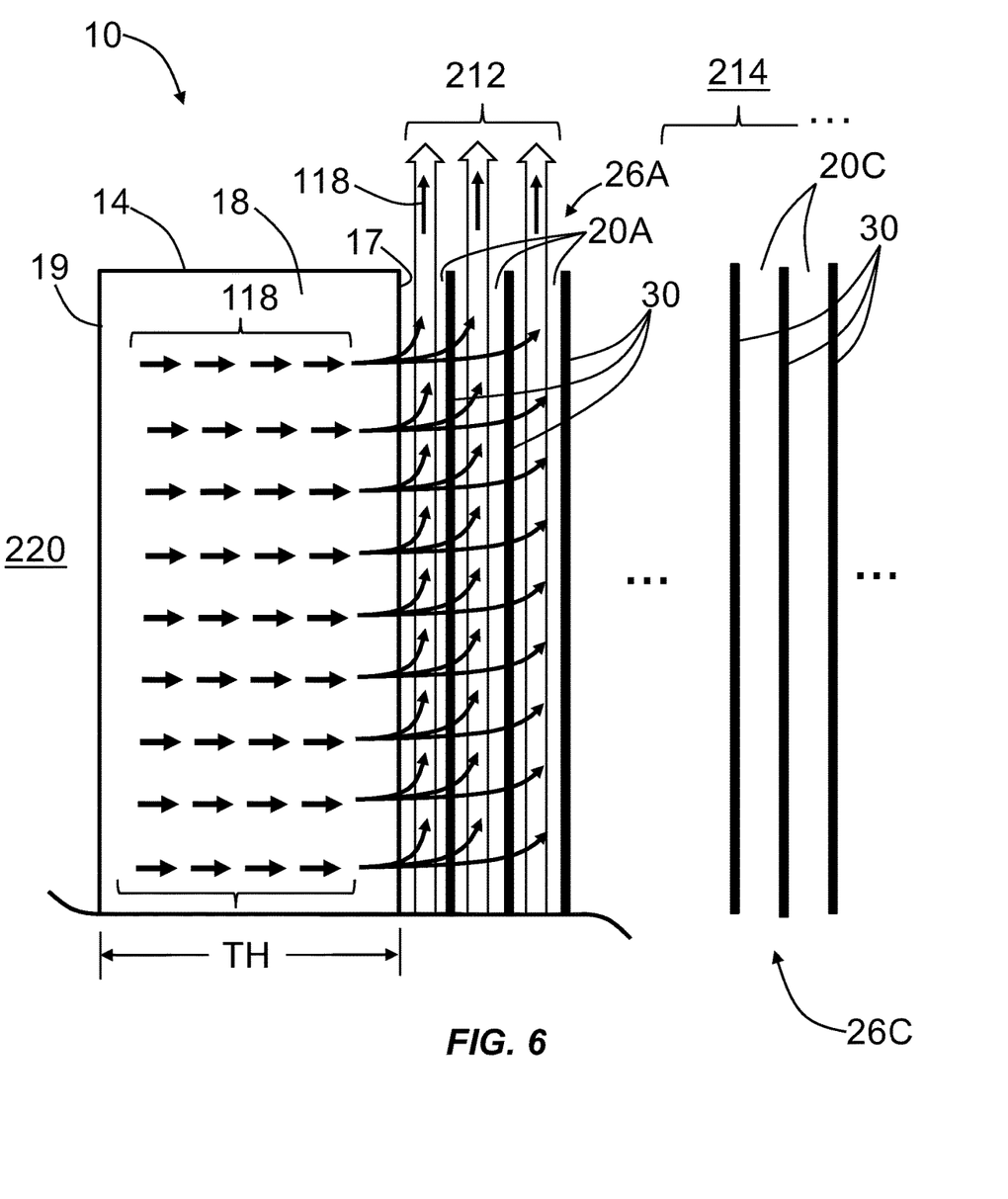
FIG. 6 is a close-up, cross-sectional view of an end portion of the wet-skinned ceramic ware of FIG. 5B, showing how the flow of air through the outer cells of the web draws moisture from the wet skin and carries the moisture away from the ceramic ware at the output end of the ware, thereby drying the wet skin from the inside of the ceramic ware (i.e., from the interior web)

FIG. 6 is a close-up cross-sectional view of an end portion of example wet-skinned ware 10 showing wet skin 18 and some of cells 20, including some outer cells 20A in annular portion 26A and some inner or central cells 20C in central portion 26C. The wet skin 18 includes moisture 118. As airstream 212 flows through outer cells 20A from front end 12 to back end 14 of ceramic ware 10, moisture 118 in skin 18 is drawn toward the dry web 26. As moisture 118 enters web 26, it is carried away by airstream 212 flowing through outer cells 20A and exiting back end 14 of ceramic ware 10. This process continues until skin 18 is substantially dry. Thus, wet skin 18 is dried substantially only from the inside of skinned ceramic ware 10 and not from the outside, i.e., is dried substantially "from the inside out."

Note that in the example embodiment illustrated in FIG. 6, no portion of airstream 212 and no other airstream or gas stream flows over outer surface 19 of skin 18. Rather, in the example, airstream 212 is limited to flowing only through annular portion 26A of web 26. There is no need for airstream 212 to flow either over outer surface 19 of skin 18 or through central cells 20C that are close to central axis $A_1$ of wet-skinned ware 10. In the former case, this is because airflow over outer surface 19 can cause cracking and also can cause the aforementioned undesirable migration of silica particles. In the latter case, this is because moisture 118 being drawn into web 26 from skin 18 does not make it very far into the web because the web is dry and because annular airstream 212 carries away the moisture faster than the moisture can migrate into central portion 26C of the web. This is why airstream 212 can have a central no-flow region 214. It is generally more advantageous that any air 112 that would otherwise go through central portion 26C of web 26 be directed to pass through outer annular portion 26A to increase the airflow through outer cells 20A. The faster the airflow of airstream 212 through outer cells 20A, the faster the drying can occur. The speed of the airflow of airstream 212 is limited only by the damage threshold of web 26 when subjected to the force of air 112. Because web 26 is made of a hardened ceramic material, the damage threshold to airflow is relatively high, thereby allowing for a very high-velocity airstream.

The rate of drying of skin 18 can be enhanced if air 112 has relatively low humidity, e.g., 15% or less or even 10% or less. This allows air 112 and airstream 212 formed therefrom to hold more of the moisture that wicks from wet skin 18 into the dry outer portion 26A of web 26.

Figure 7A:
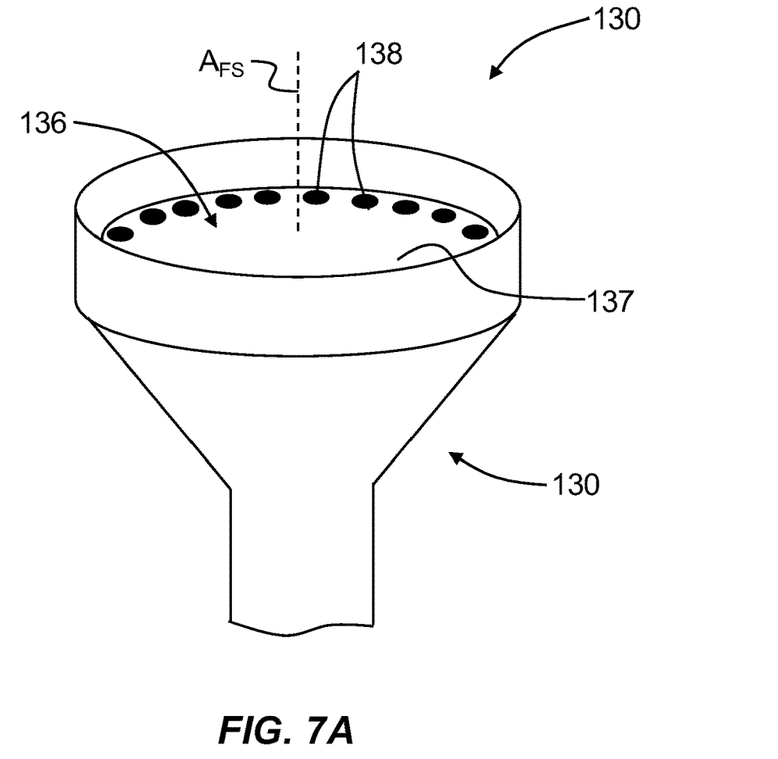
FIG. 7A is an elevated view of an example flow-shaping device that includes a flow-shaping member that has an array of holes adjacent the perimeter of the flow-shaping member.
Figure 7B:
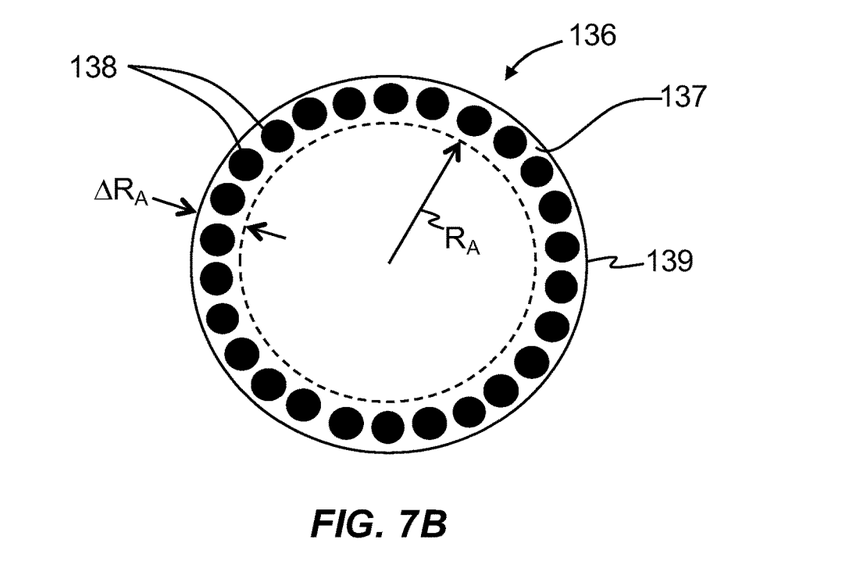
FIG. 7B is a top-down view of the example flow-shaping member of FIG. 7A.

FIG. 7A is an elevated view of an example flow-shaping device 130 that includes a flow-shaping member 136 arranged adjacent output end 132. FIG. 7B is a front-on view of flow-shaping member 136 of FIG. 7A. The flow-shaping member 136 is configured to shape the flow of air 112 to form annular airstream 212. The example flow-shaping member 136 of FIGS. 7A and 7B is in the form of a plate that has an upper surface 137 that includes holes 138 arranged around an adjacent perimeter 139. The air 112 is forced through holes 138 to create annular airstream 212. The size and spacing of holes 138 define the geometry of annular airstream 212. In this example, holes 138 act as simple nozzles.

Figure 8A:
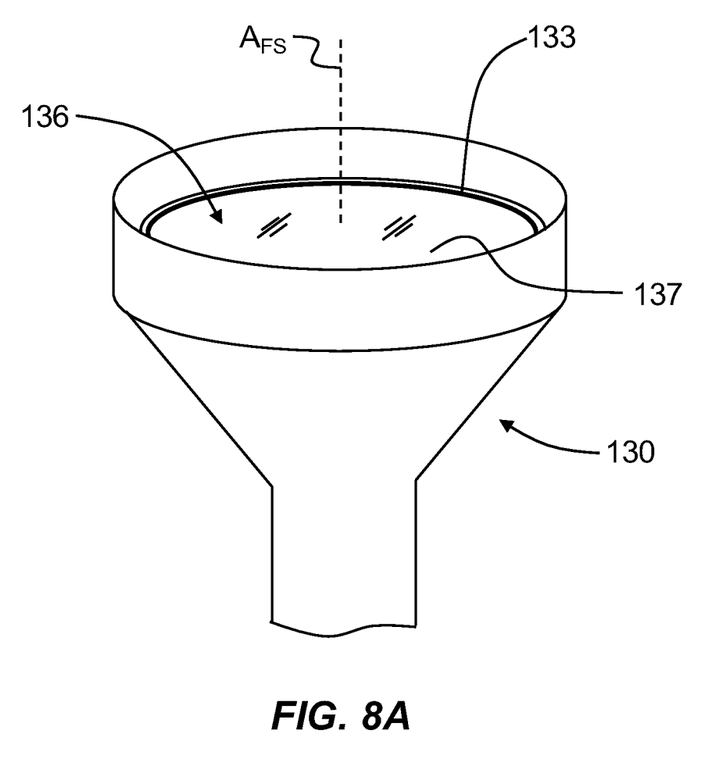
FIG. 8A is similar to FIG. 7A and illustrates an example flow-shaping device wherein the flow-shaping member has an annular opening that defines a cylindrical annular airstream.
Figure 8B:
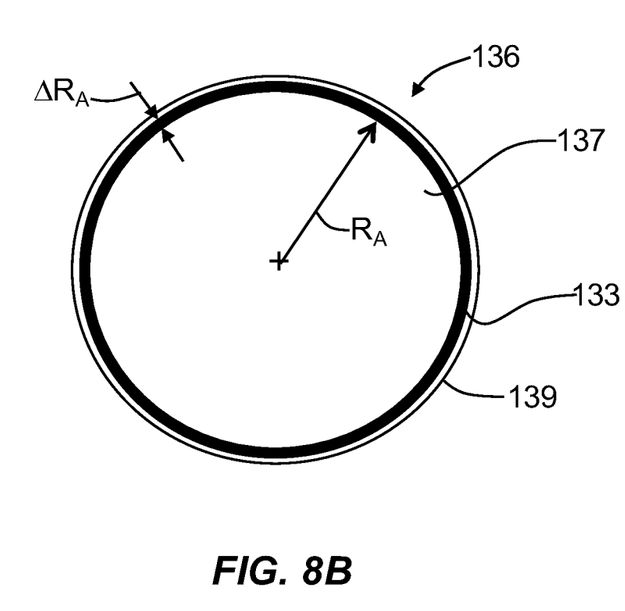
FIG. 8B is similar to FIG. 7B and is a top-down view of the flow-shaping member of FIG. 8A.

FIGS. 8A and 8B are similar to FIGS. 7A and 7B and illustrate another example of flow-shaping member 136 that includes an annular opening 133 adjacent perimeter 139 and through which air 112 passes to define annular airstream 212.

Figure 9A:
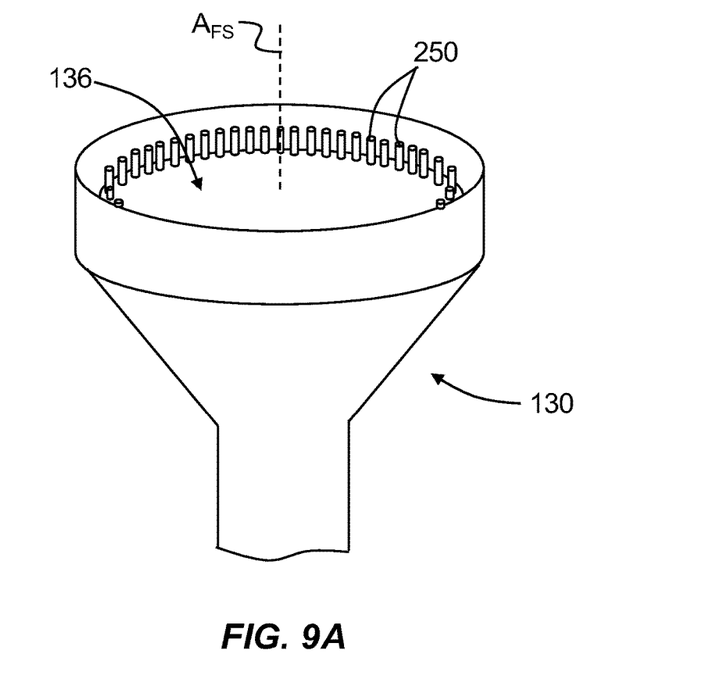
FIG. 9A is similar to FIG. 7A and illustrates an example flow-shaping device wherein the flow-shaping member has an array of air nozzles that each emit an air jet, wherein the air jets collectively define a substantially cylindrical annular airstream.
Figure 9B:
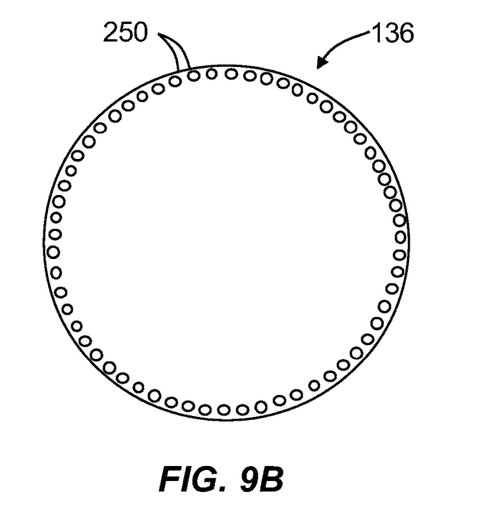
FIG. 9B is similar to FIG. 7B and is a top-down view of the flow-shaping member of FIG. 9A.
Figure 9C:
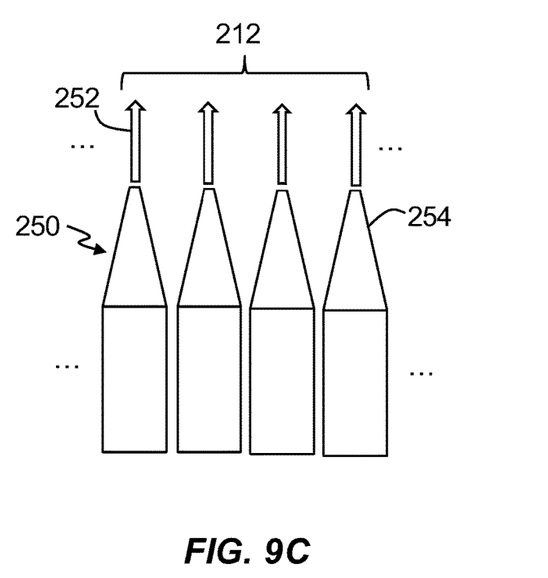
FIG. 9C is a side view of four exemplary air nozzles in the array of nozzles used in the flow-shaping device of FIGS. 9A and 9B, showing the emission of an air jet from each nozzle.

FIGS. 9A and 9B are similar to FIGS. 7A and 7B and illustrate another example of flow-shaping member 136 that includes an array of air nozzles 250. The array of air nozzles 250 is arranged in a ring adjacent perimeter 139. FIG. 9C is a close-up side view of three exemplary air nozzles 250, each emitting an air jet 252 through a tapered end 254. The combined air jets 252 define annular airstream 212.

Figure 10A:
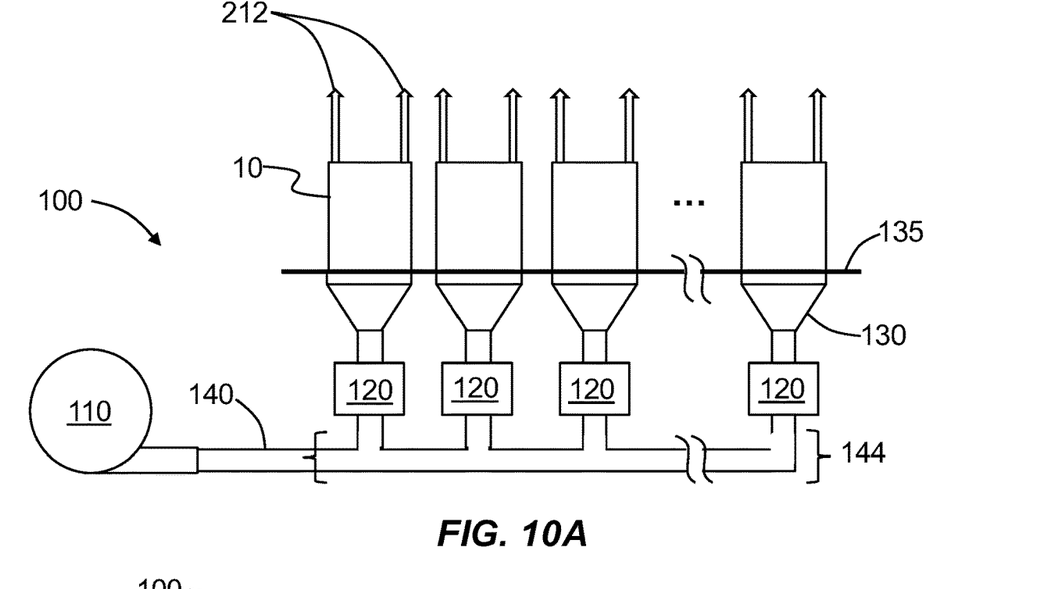
FIG. 10A is similar to FIG. 4 and illustrates an example embodiment of an air-drying system wherein the system can dry multiple ceramic wares at once.

FIG. 10A is similar to FIG. 4 and illustrates an example embodiment of system 100 that can be used to perform skin drying of multiple ceramic wares 10 at once. The system 100 of FIG. 10A includes a single conduit section 140 that leads from blower 110 to an air manifold 144. The air manifold 144 is configured to direct air 112 from blower 110 to multiple conduit sections 140 attached to respective flow-shaping devices 130. Each flow-shaping device 130 supports a wet-skinned ware 10 for drying as described above.

Figure 10B:
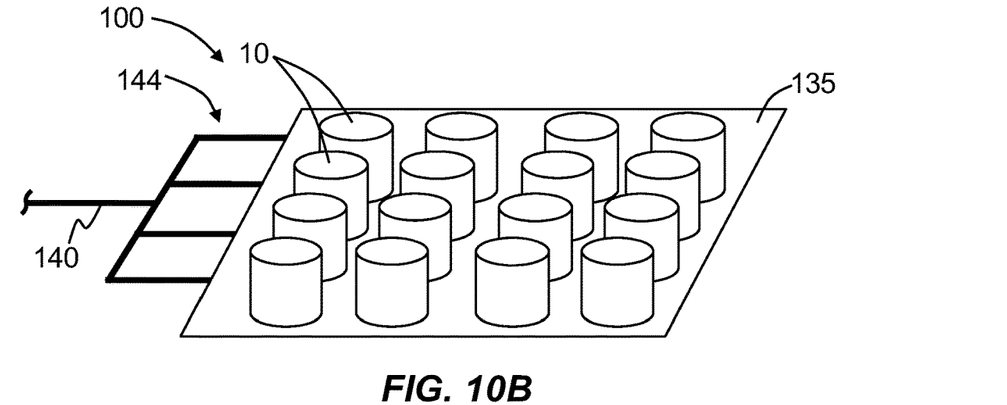
FIGS. 10B and 10C are elevated views of multiple ceramic wares supported by different configurations of one or more support members for the air-drying system of FIG. 10A.
Figure 10C:
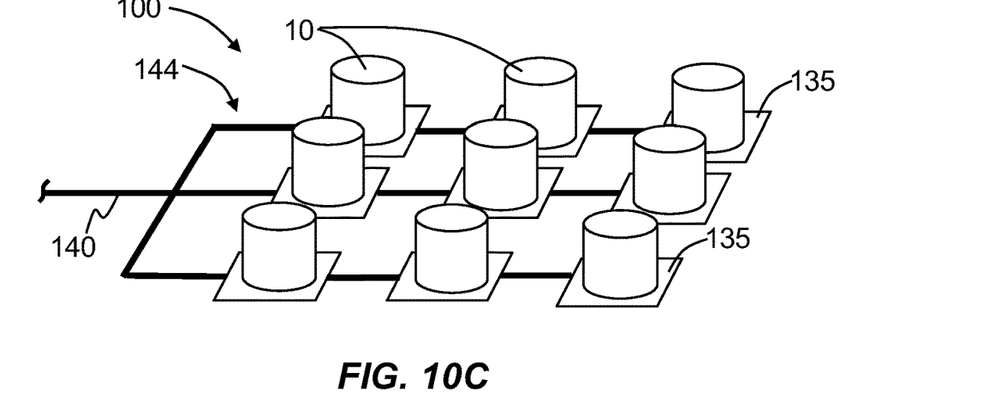

The system 100 of FIG. 10A can include a single air heater 120 or multiple air heaters 120, one for each flow-shaping device 130, as shown. FIGS. 10B and 10C are top-down views of example configurations of support member 135 supporting multiple wet-skinned wares 10 over respective flow-shaping devices 130 for system 100 of FIG. 10A. The support members 135 of FIG. 10C can be configured for rotating each of the wet-skinned wares 10 as described above in connection with FIG. 4. In an example, the rotation of wet-skinned ceramic ware 10 by rotating support member 135 can be used to perform the aforementioned sequential flow of air through select outer cells 20A. In an example, the system 100 of FIG. 10A can move, for example, from a loading station to an unloading station (not shown), while in another example the system can be stationary.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of applying and drying an outer peripheral portion of a cellular ceramic ware, the ware comprising an interior web having walls that define a plurality of channels extending between first and second ends of the ware, the method comprising:
   applying a wet skin on an outer periphery of the interior web when the interior web is dry to form the outer peripheral portion of the cellular ceramic ware; and
   directing a stream of gas into an annular portion of the interior web adjacent to the outer peripheral portion to dry an inner surface of the outer peripheral portion.

2. The method according to claim 1, wherein no gas is directed to the outer surface of the outer peripheral portion.

3. The method according to claim 1, wherein no gas is directed into at least one of the innermost channels of the interior web.

4. The method according to claim 1, wherein the drying causes a liquid in the outer peripheral portion to migrate into one or more channels of the interior web.

5. The method according to claim 1, wherein the outer peripheral portion comprises a ceramic or a glass.

6. A method of applying and drying a wet skin disposed on an outer surface of a cellular ceramic ware having first and second ends, a radius and a dry interior web, comprising:
   applying the wet skin on the dry interior web of the cellular ceramic ware;
   generating an airstream; and
   directing the airstream through the first end of the cellular ceramic ware only through an annular portion of the interior web that is adjacent the outer surface to cause moisture in the wet skin to migrate inwardly toward the interior web and to be removed from the annular portion of the interior web when the airstream exits the second end.

7. The method according to claim 6, wherein the annular portion of the interior web has an annular radius of between 1 and 200 cells.

8. The method according to claim 6, wherein the air has a temperature of between 15° C. and 100° C.

9. The method according to claim 6, wherein the skin is dried and is substantially free of cracks after a drying time of between 10 minutes and 20 minutes.

10. The method according to claim 6, wherein the air has a humidity of less than 15%.

11. The method according to claim 6, including defining the airstream to have an annular cylindrical shape by passing air through a flow-shaping device.

12. The method according to claim 6, wherein the wet skin includes silica particles, and wherein the silica particles do not substantially migrate outwardly away from the interior web as the airstream flows through the annular portion of the interior web.

13. The method according to claim 6, further including rotating the ceramic ware as the airstream passes through the annular portion of the interior web.

14. The method according to claim 6,
   wherein the cellular ceramic ware comprises central and outer longitudinal cells;
   wherein generating an airstream comprises generating a substantially annular airstream;
   wherein directing the airstream through the first end of the cellular ceramic ware comprises directing the substantially annular airstream into the first end of the ceramic ware only through the outer longitudinal cells that constitute an annular portion of the interior web adjacent the outer surface while not flowing either the annular airstream or another gas stream over an outer surface the wet skin.

15. The method according to claim 6, further comprising: avoiding a substantial flow of air or other gas over the outer surface of the wet skin.

16. A drying system for drying a wet-skinned ware defined by a wet skin disposed on an outer surface of a dry unskinned cellular ceramic ware having first and second ends, a radius and a dry interior web that defines an array of cells, comprising
   a blower that provides an initial flow of air;
   a flow-shaping device pneumatically connected to the blower, the flow-shaping device configured to form from the initial flow of air a substantially annular air stream; and
   a support member configured to operably support the wet-skinned ware relative to the flow-shaping device such that the substantially annular air stream is directed through the first end of the ceramic ware only through an annular portion of the interior web that is adjacent the outer surface.

17. The drying system according to claim 16, further including a heater operably disposed between the blower and the flow-shaping device.

18. The drying system according to claim 16, wherein the flow-shaping device includes a flow-shaping member that includes holes, an annular opening or an array of nozzles.

19. The drying system according to claim 16, wherein the support member is configured to rotate so that the wet-skin ware rotates as the substantially annular air stream passes through the annular portion of the interior web.

\* \* \* \* \*